April 5, 1932.   V. E. HOFMANN   1,852,570
GLASSWARE FORMING MACHINE
Filed Sept. 17, 1928   6 Sheets-Sheet 1

Inventor
Victor E. Hofmann
By J. F. Rule
Attorney

April 5, 1932.   V. E. HOFMANN   1,852,570
GLASSWARE FORMING MACHINE
Filed Sept. 17, 1928   6 Sheets-Sheet 4

FIG-5-

Inventor
Victor E. Hofmann
By J. F. Rule,
Attorney

Patented Apr. 5, 1932

1,852,570

UNITED STATES PATENT OFFICE

VICTOR E. HOFMANN, OF TOLEDO, OHIO, ASSIGNOR TO OWENS-ILLINOIS GLASS COMPANY, OF TOLEDO, OHIO, A CORPORATION OF OHIO

GLASSWARE FORMING MACHINE

Application filed September 17, 1928. Serial No. 306,465.

The present invention relates to improvements in machines for forming hollow glassware, and more particularly to that type embodying an annular series of molds which are brought in succession to a charge gathering station at which charges are delivered by gravity to the molds thru open upper ends of the latter. In this type of machine, it is the usual practice to arrange a neck mold at the lower end of a blank or gathering mold in such a manner that when a charge of glass is delivered to the blank mold, portions of glass are packed into the neck mold cavity to thereby form the finish or neck of the article. This glass is then expanded to completely form a parison and then the blank mold opens so that the neck mold may be inverted and thereby swing the bare parison to a pendent position in which it is enclosed by a finishing mold and then blown to the final shape of the ware being produced. This meets with the objection that the parison is distorted by being swung outwardly and downwardly for enclosure in the finishing mold and is also subject to uneven surface chilling. These factors combine to prevent the production of best quality ware.

An object of the present invention is to minimize the extent of movement to which the glass is subjected after delivery to the blank mold. To this end, the invention comprises providing a blank mold movable vertically relative to a neck mold whereby a parison formed while the molds are in cooperative relation is suspended from the neck mold for enclosure in a finishing mold for final blowing. The neck mold remains stationary, except for the rotary movement of the machine, from the time the finish or neck is formed on the parison until the parison has been blown to its final shape and is substantially ready for ejection from the machine as a finished article. Accordingly, the glass is not unevenly chilled and neither is it moved in a fashion to distort either the parison or the final blown article.

Another object is to provide a novel type of neck mold and funnel guide requiring little space and capable of rapid and accurate operation. To this end, there is provided interconnected funnel guide and neck mold sections mounted upon a single support and equipped with means whereby said sections may be oscillated about the common axis to thereby alternately bring the neck mold and funnel guide sections into cooperative relation with a blank mold.

Another object of the invention is to provide a ware forming unit in which the relative arrangement of the molds is such that the blank or parison is initially formed in an upright position and is not subject to movement other than that caused by rotation of the mold carriage, until said parison is ejected from the machine in its final shape.

Other objects will be apparent hereinafter.

In the accompanying drawings:

Fig. 1 is a sectional elevation of one head of the machine at the mold charging station.

Fig. 1—A is a detail view showing the bottom plate in raised position.

In the preferred embodiment of the invention, as shown on the accompanying drawings, the machine comprises a stationary base 15 from which arises a stationary central pillar 16 which, with the base 15, rotatively supports an annular series of ware forming units or mold groups. Since the mold groups are identical in construction and operation, the description of the specific details will for the greater part be directed to one group only.

A mold carriage is rotatively mounted on the base 15 and includes a circular frame or base member 17 (Fig. 1) rigidly connected thru vertical posts 18 to an annular table 19 in part supported by said pillar 16.

A table 20 (Figs. 1 and 5) is mounted on the posts 18, extends around the central pillar 16 and supports an annular series of finishing molds. Each parison forming unit (Figs. 1, 2 and 5) comprises a pair of slideways 21 rising from the ends of bracket arms 22 on the circular base member 17 of the mold carriage and mounting therein a slide 23, supporting at its upper end a blank mold 24. While other types of molds may be employed, I have for the purpose of the present application, shown a one piece mold having an open upper end thru which mold charges are delivered to the cavity 25. This mold is subject to vertical movement at regular intervals, such movement effected by a cam actuated rack and pinion mechanism. This operating mechanism (Figs. 1, 2 and 5) comprises a pair of transversely spaced vertical rack bars 26 secured at their lower ends to the bracket arm 22. Pinions 27 (Fig. 2) on a transverse shaft 28 run in mesh with said rack bars 26. This shaft 28 mounts an intermediate pinion 29 running in mesh with a rack bar 30 formed on the inner face of the slide 23. Links 32 connect the pinion carrying shaft 28 thru a hinge pin 33 to a lever 34 (Fig. 1), the latter fulcrumed adjacent its inner end upon a hinge pin 35 in a bearing 36. A cam roll 37 on the inner end of the lever 34 runs in a stationary cam 38 (Figs. 1 and 2) shaped to rock the lever about the hinge pin 35 at regular intervals to thereby alternately raise and lower the blank mold 24.

Figures 8, 9, 10:
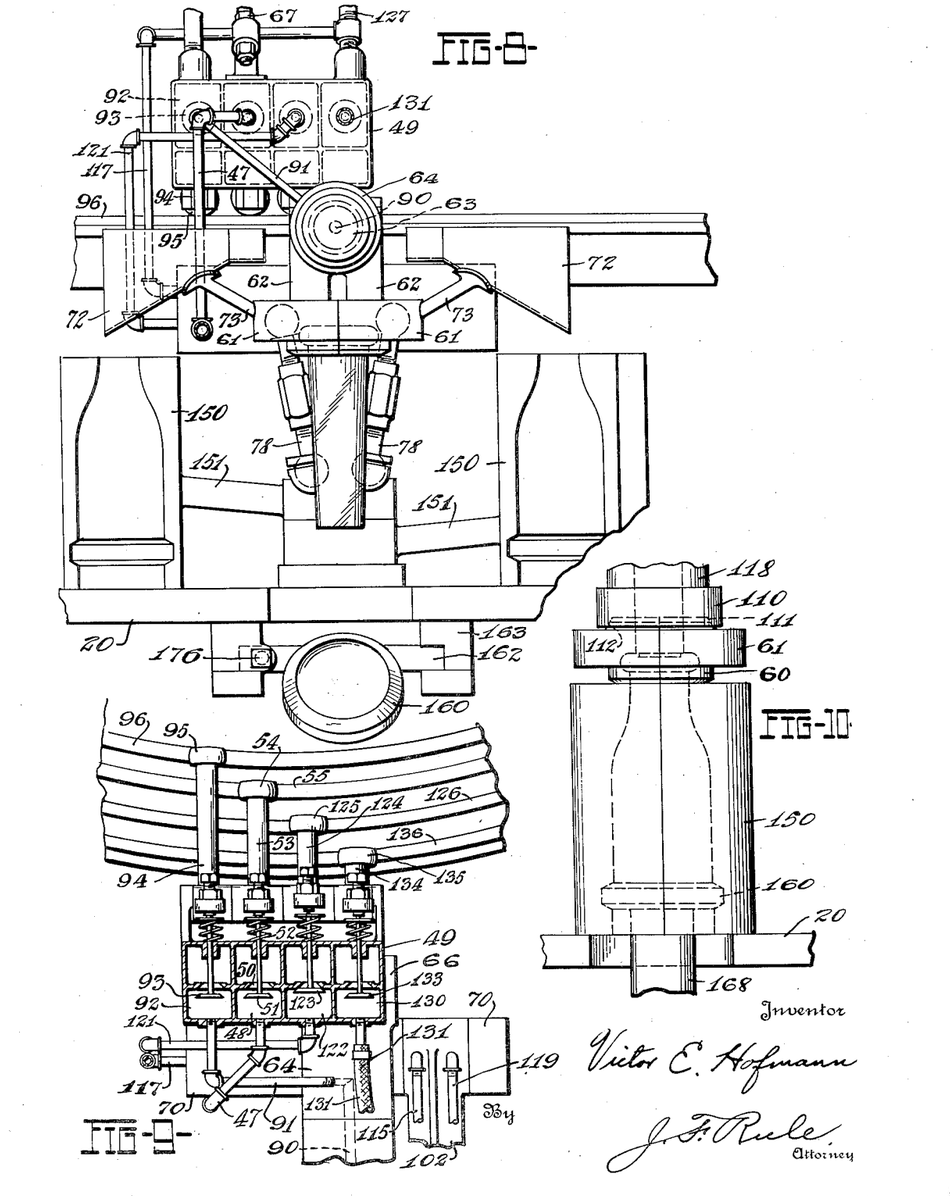
Fig. 8 is a fragmentary front elevation, showing a parison suspended from a neck mold just prior to enclosure in a finishing mold.
Fig. 9 is a plan view with parts in section, illustrating the vacuum and air pressure control mechanism.
Fig. 10 is a front elevation of the finishing mold closed about a blown article.

The blank mold 24 is provided at its lower end (Fig. 5) with a port 40 normally closed by a spring actuated valve 42 partly enclosed in a cap 43 having connection to an air pressure supply pipe 44. This supply pipe 44 (Figs. 1, 2 and 5) is substantially U-shape and has its free end telescoped into a hollow head 45 mounted on a bracket arm 46. This arm may be secured to one of the slideways 21. The hollow head 45 is connected thru a pipe 47 (Figs. 5, 8 and 9) to an air pressure compartment 48 in a valve box 49. This compartment 48 is divided into two chambers communicating with each other at times thru a port 50 having a valve 51 which is normally seated by a spring 52 (Fig. 9). A rock arm 53 is provided to unseat the valve, said arm carrying a cam roll 54 running on a stationary cam 55 which is shaped to rock said arm at regular intervals whereby air pressure may be applied thru pipes 47 and 44 to the lower end of the mold cavity to move a charge of glass upwardly in the mold for a purpose hereinafter apparent.

A neck mold and funnel guide cooperate with the upper charge receiving end of the blank mold in the delivery of charges to the latter and transformation of these delivered charges into parisons which are later enclosed in finishing molds for final blowing. This unit comprises two neck mold sections 60 (Fig. 5) removably supported in carriers 61 on arms 62 which are journaled upon a short radial shaft 63.

Figures 1, 1A:
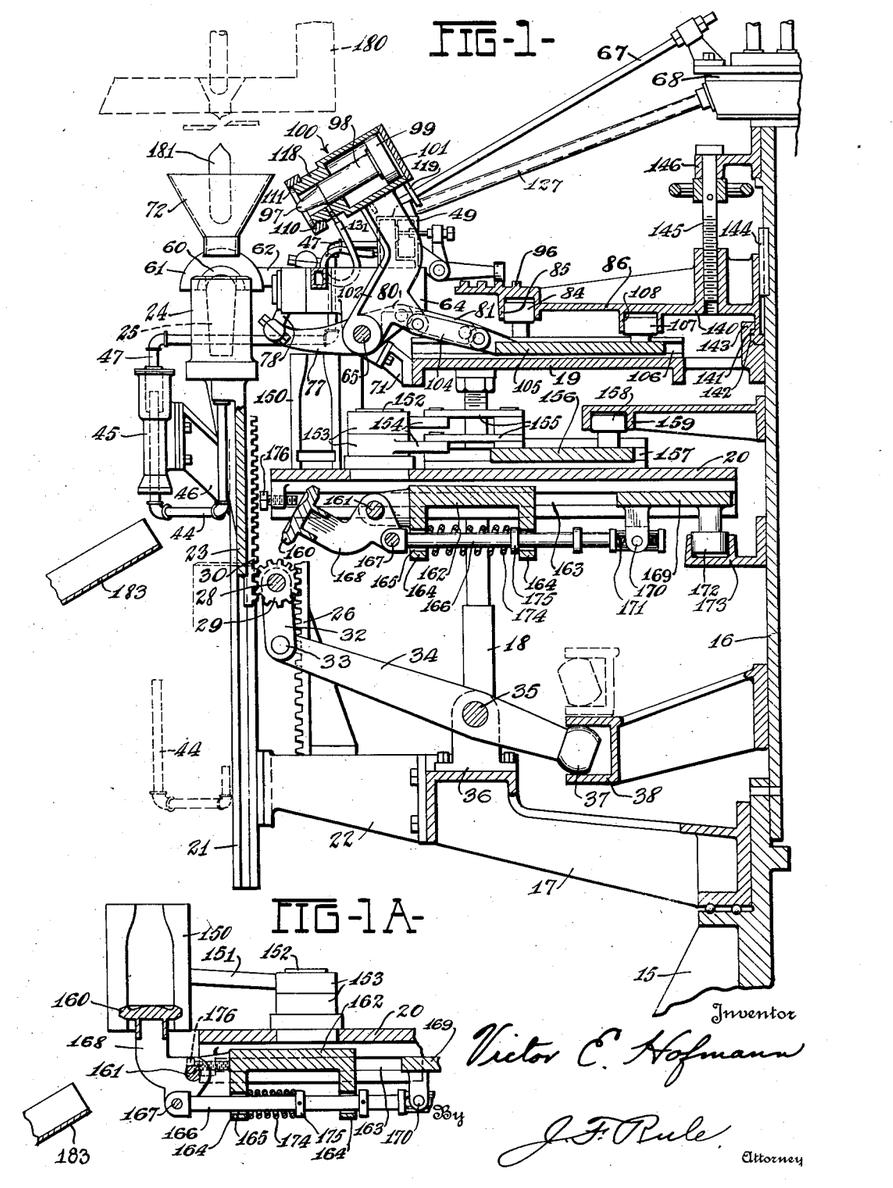
Figure 4:
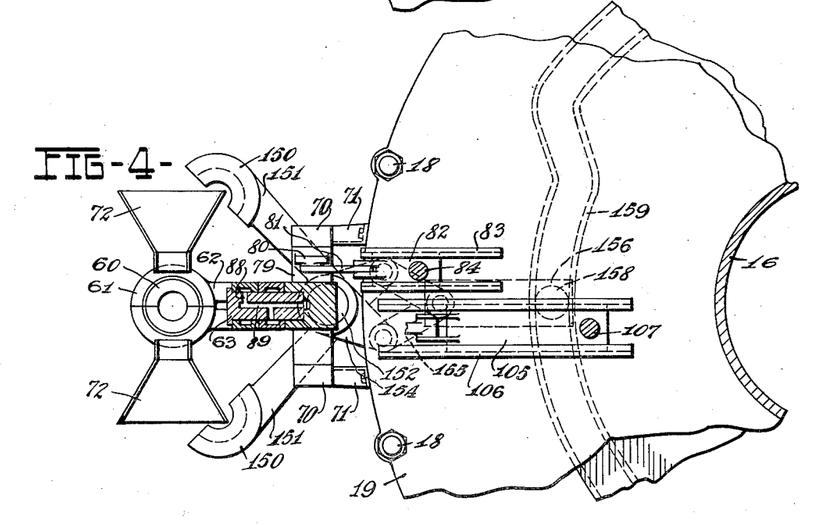
Fig. 4 is a plan view with parts in section, showing the funnel guide open and neck mold closed.
Figure 7:
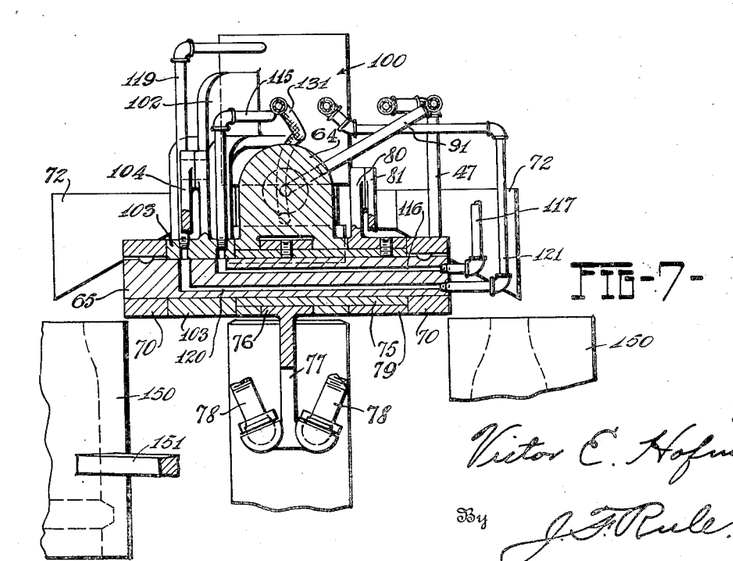
Fig. 7 is a transverse sectional view taken substantially at the line VII—VII of Fig. 6.

This shaft 63 is removably secured in a recess in a supporting block 64 (Figs. 5 and 7), the latter rigidly supported on a transverse shaft 65 and carrying an inwardly extending flange 66 (Fig. 5) which supports the aforementioned valve box 49. This valve box 49 is connected thru radial rods 67 to the cap 68 (Fig. 1). Thus, the valve box 49 is rigidly held in an upright position and the supporting block 64 is held against rotation about the transverse shaft 65. This construction serves to hold the radial shaft 63 against movement and consequently insures proper cooperation between the neck and blank molds. The aforementioned transverse shaft 65 is non-rotatively supported in transversely spaced blocks 70 (Figs. 4 and 7) at the outer ends of arms 71 extending radially from the upper table 19 of the mold carriage.

Figure 6:
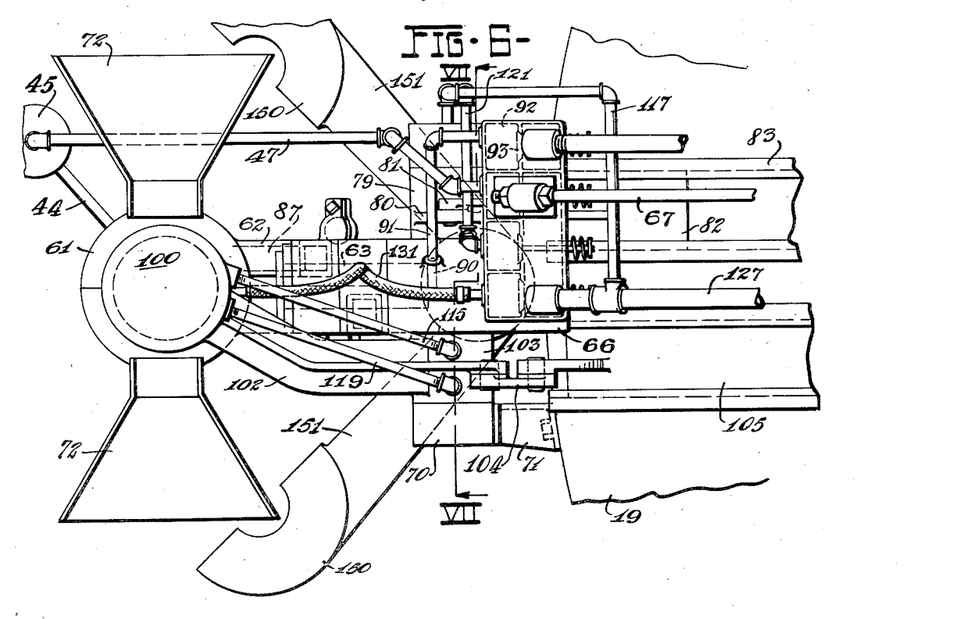
Fig. 6 is a detail plan view similar to Fig. 4 and showing the air and vacuum line connections.

The funnel guide (Figs. 6 and 8) comprises a pair of cooperating sections 72 rigidly connected thru arms 73 to the halves of the neck mold carrier 61. The relative positions of the funnel guide and neck mold sections (Figs. 2 and 8) is such that when the funnel guide sections are brought together preparatory to assisting in directing a charge of glass into the blank mold (Figs. 1 and 2), the neck mold sections are positioned at opposite sides of the upper portions of the blank mold. After passing beyond the charging station and following delivery of the charge of glass into the blank mold, the funnel guide sections 72 (Fig. 8) are separated to bring the neck mold halves into cooperative relation to each other and the upper end of the blank mold.

The mechanism for operating the neck mold and funnel guide in the manner just described comprises a sleeve 75 (Fig. 7) encircling a portion of the stationary shaft 65 and pinned or otherwise fixed to a collar 76, the latter formed with a depending arm 77. This arm 77 has swivel connection to a pair of links 78 (Fig. 5) whose uper ends have swivel connection to the arms 62 which support the neck mold carrier 61. These links 78 are adjustable in the direction of their length to provide for proper cooperative positioning of the halves of the neck mold and funnel guide as will be apparent. The sleeve 75 (Figs. 4 and 7) has pinned to one end a collar 79. An upstanding ear 80 on said collar 79 is connected thru a link 81 to a slide 82 movable radially of the upper table 19 of the mold carriage in guideways 83. A cam roll 84 is carried by the slide 82 and runs in a stationary cam 85 on a cam table 86 positioned above and in proximity to the upper table 19 of the mold carriage. Thus, it is apparent that with radial reciprocation of the slide 82 at regular intervals, the funnel guide and neck mold will be brought one at a time into an operative position over the blank mold.

Vacuum is applied to the neck mold cavity (Fig. 5) at regular intervals to cause sufficient upward movement of the glass in the blank mold 24 to fill the neck mold cavity and thereby form the neck or finish of the parison. Accordingly, the neck mold is formed with an annular chamber 60$^a$ (Fig. 5) communicating with vacuum grooves 60$^b$ and with vacuum passageways 87 extending thru the neck mold carrier 61 and supporting arms 62. These passageways communicate thru aligned ports 88 with an axial passageway 89 thru said neck mold supporting shaft 63. One end of the axial passageway 89 communicates thru a radial port 90 with a vacuum pipe 91 (Figs. 5, 6 and 8), the latter leading to a vacuum chamber 92 at one end of the valve box 49. This chamber is provided with a valve 93 actuated at regular intervals by a rock arm 94 which carries at its outer end a cam roll 95 running upon a stationary cam 96. This cam 96 is shaped to rock the arm 94 (Fig. 9) at regular intervals to thereby apply vacuum thru said passageways 87 and 89 to the neck mold cavity for the purpose previously stated.

Figure 3:
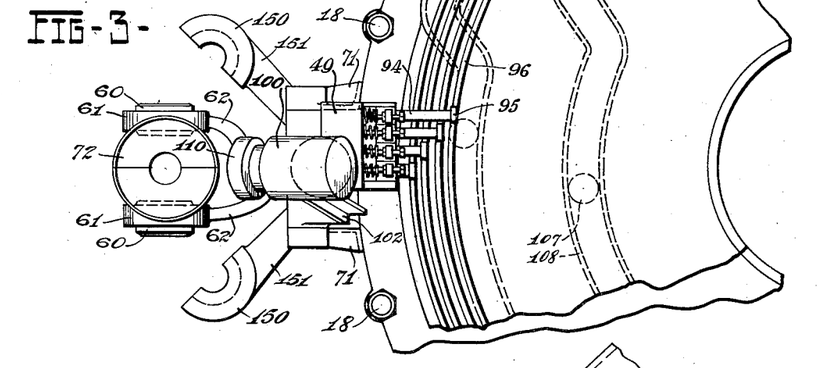
Fig. 3 is a plan view of the head shown in Figs. 1 and 2.
Figure 5:
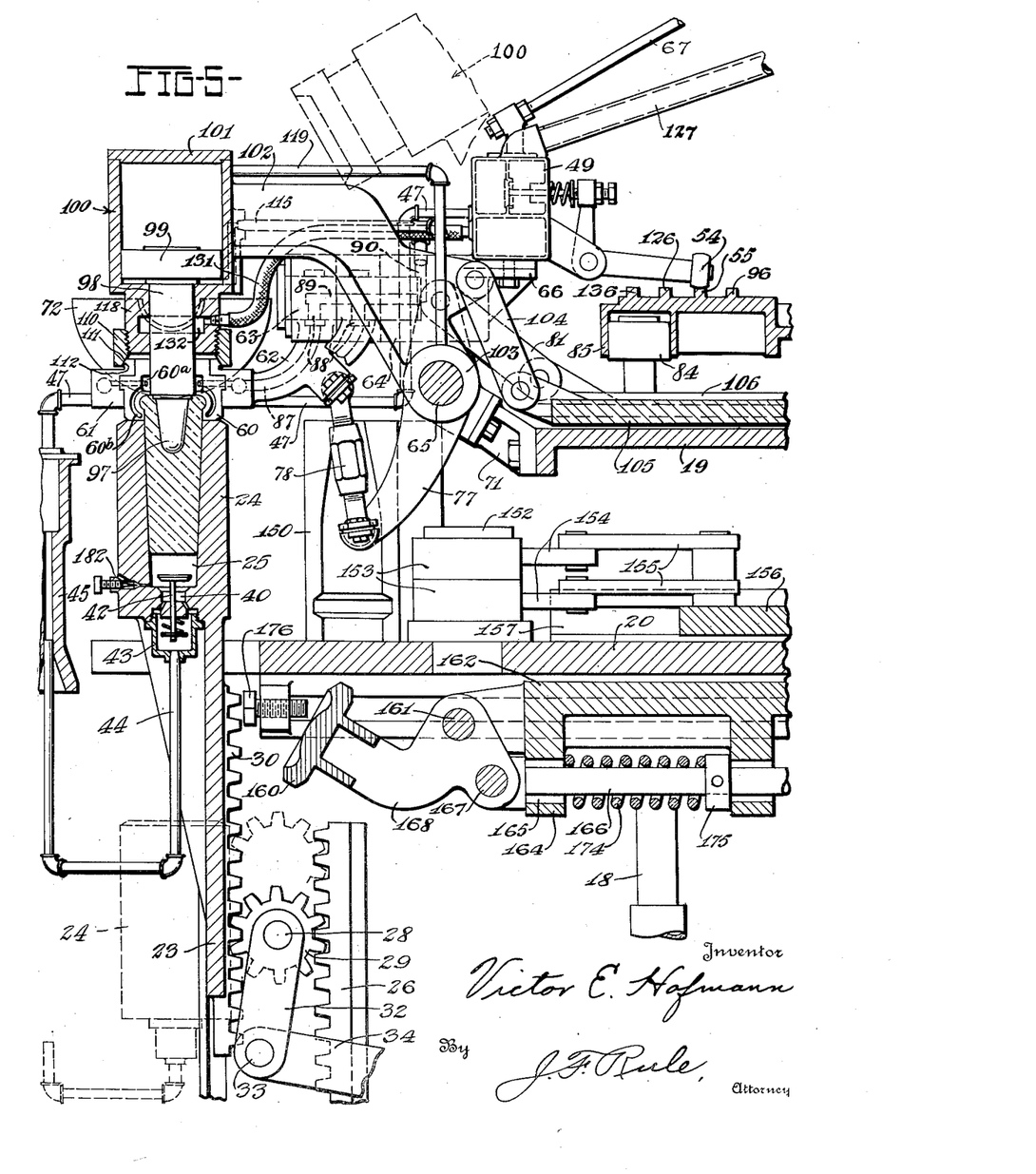
Fig. 5 is a detail sectional elevation illustrating the manner in which the neck or finish is formed on the blank.

Each mold group includes a plunger 97 (Fig. 5) fixed to the lower end of a plunger rod 98 on a piston 99 of an air motor 100, the latter including a cylinder 101 rigidly mounted on an angular arm 102 (Figs. 1 and 5). This arm 102 is formed with a collar 103 journaled on the shaft 65 (Fig. 7) and is connected thru a link 104 to a slide 105 reciprocable on the upper table 19 of the mold carriage in guideways 106. This slide 105 carries a cam roll 107 at its inner end running in a stationary circular cam 108 (Fig. 3) which is shaped to periodically reciprocate said slide and thereby swing the air motor about the axis of its supporting shaft to thereby axially align the plunger and blank mold at regular intervals. The lower end of the air motor cylinder (Fig. 5) carries a sleeve 110 having a tapered face 111 which engages a similarly tapered shoulder 112 on the upper side of the neck mold carrier 61 when the air motor is lowered. These cooperating tapered surfaces serve to properly align the neck mold cavity and plunger whereby the latter may be readily projected into the neck and blank mold cavities as shown in Fig. 5.

The plunger 97 is normally held in its uppermost position (Fig. 1) by the application of constant air pressure thru a pipe 115 (Fig. 5) to the lower side of the differential piston 99. This air pressure supply pipe 115 (Figs. 5, 6 and 7) leads thru the collar 103 to a longitudinal passageway 116 in the neck mold supporting shaft 65, said passageway communicating at its other end with a supply pipe 117 which is connected to an air pressure supply pipe 127 (Fig. 6) thru which air is supplied to the pressure chambers of the valve box 49. Thus, provision is made whereby the plunger is normally held at its uppermost limit within the sleeve 110 and extension 118 on the air motor cylinder. The plunger 97 is moved downwardly to the Fig. 5 position at regular intervals by the application of air pressure to the upper side of the piston 99. The effective area of the upper surface of the piston is materially greater than that of the lower surface so that the constant air pressure on the lower surface is overbalanced and the piston lowered. This air pressure is by way of an air pressure supply pipe 119 (Figs. 5, 6, and 7), said pipe being connected to the longitudinal passageway 120 extending thru the stationary shaft 65 and communicating at one end with a pipe 121. This pipe 121 leads to the air pressure chamber 122 in the valve box 49 (Fig. 9). A valve 123 controls the flow of air pressure to the pipe 121, said valve being actuated by a rock arm 124 carrying a cam roll 125 running on a stationary circular cam 126, the latter shaped to periodically rock the arm 124, open the valve 123 and permit application of air pressure thru the pipe 119 to the upper end of the air motor 100. Thus, the plunger may be projected downwardly into the neck and blank mold cavities as shown in Fig. 5.

After the plunger has been projected into the neck and blank mold cavities (Fig. 5), the mass of glass is moved upwardly to fill the neck or finish cavity, and following this movement of the glass vacuum which has caused such movement is cut off and the plunger again lifted to a position above the neck mold. The blank is then expanded in the blank mold by the application of air pressure to the initial blow opening formed by the tip of the plunger 97. This expanding pressure or "blowdown air" is supplied from a chamber 130 in the valve box 49 thru a flexible pipe 131 to an annular chamber 132 (Fig. 5) formed in the extension 118 which guides the plunger rod 98. A valve 133 in the air pressure chamber 130 is operated periodically by a rock arm 134 carrying a cam roll 135 running upon a stationary circular cam 136, the latter shaped to rock said arm at regular intervals to thereby unseat the valve and permit blowdown air to flow thru the flexible pipe 131 and into the initial blow opening in the upper end of the blank. Thus, the glass is expanded to form a parison.

The neck mold, funnel guide and elements associated therewith and supported on the upper table 19 of the mold carriage are adjustable vertically to adapt the machine for the production of different sizes and types of ware, said adjustment being effected by moving the table 19 and a cam table 140 as a unit with respect to the pillar 16. These tables are interconnected (Fig. 1) by forming a radial rib 141 on the lower portion of the cam table, said rib projecting into an annular inwardly opening recess 142 in a collar 143 on said upper table 19 of the mold carriage. The cam table is non-rotatively connected to the central pillar 16, there being a splined connection 144 between said elements whereby the cam table may be moved vertically or non-rotatively upon said pillar. One or more manually adjustable screws 145 (Fig. 1) may suspend said tables from suitable bosses 146 at the upper end of the pillar 16, said screws being rotatable to change the elevation of said tables to accommodate molds of different heights or types.

The finishing mold 150 (Figs. 1, 2 and 5) comprises a pair of cooperating sections connected thru mold arms 151 to a vertical hinge pin 152. Collars 153 formed on the inner ends of said arms and encircling said hinge pin are provided with ears 154 which are connected thru links 155 to a slide block 156 running in slideways 157 (Fig. 1). A cam roll 158 is carried by the slide block 156 and runs in a stationary circular cam 159 suitably fixed to the stationary pillar 16. This cam 159 is of a shape to alternately open and close the finishing mold at regular intervals to thereby enclose parisons which are to be blown to their final shape. A bottom plate 160 (Figs. 1—A and 5) is hinged to a transverse pin 161 at the front end of a slide block 162, the latter being mounted for radial reciprocation in slideways 163 formed on the lower side of the lower table 20 of the mold carriage. This slide block 162 is formed with a pair of depending bosses 164 having aligned openings 165 therein slidably receiving a rod 166. One end of this rod 166 is pivotally connected by a pin 167 to a finger on the bottom plate carrier 168, while its other end is yieldably connected to a slide block 169 thru a pin 170 and springs or the like 171. This slide 169 is mounted in the aforementioned slideways 163 and carries a cam roll 172 running in a stationary cam 173 mounted on the pillar 16. A coil spring 174 encircles the rod 166 between the front depending boss 164 and a collar 175 pinned to said rod. A set screw 176 extending longitudinally of and into one of the slideways 163 functions as a stop by which the outward movement of said slide block 162 is regulated.

When the bottom plate 160 is to be brought into cooperative relation with the finishing mold, the inner slide block 169 is moved radially outward and effects a corresponding movement on the part of the outer slide block 162 until the latter strikes the top 176, at which time the outer slide block 162 discontinues its outward movement. The cam 173 is shaped to effect a continued outward movement of the inner slide block 169 after the outer block has come to a stop so that the push rod 166 is moved radially outward to thereby rock the bottom plate holder 168 and raise the bottom plate 160 to a horizontal plane for cooperation with the finishing mold 150. The coil spring 174 assists materially in returning the bottom plate and its holder to the Fig. 1 position.

Figure 2:
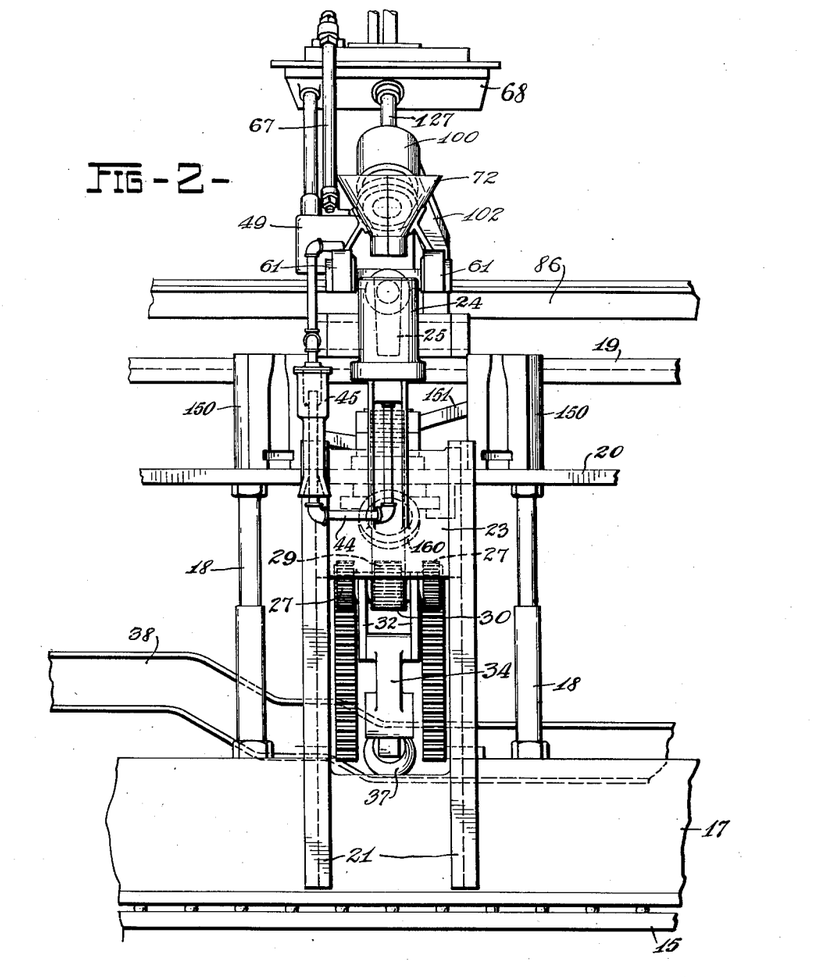
Fig. 2 is a front elevation of said head showing the funnel guide closed and the neck mold open.

The operation of the machine may be stated as follows:

A mold group or head approaches a position beneath a feeder 180 for molten glass and prior to reaching the charging position, the funnel guide sections are brought together as shown in Figs. 1 and 2, whereby accurate delivery of a charge 181 to the blank mold 24 may be assured. As the unit leaves the charging station, the funnel guide sections are moved laterally away from each other, and the cam 38 (Fig. 1) operates to lower the blank mold 24 to the Fig. 5 position at which the neck mold sections may be brought into cooperative relation with each other and with the upper or charge receiving end of the blank mold. Immediately upon assuming the position shown in Fig. 5, the plunger is projected into the neck and blank mold cavities and vacuum is applied to the neck mold cavity whereby upward movement of the glass is effected to fill the neck cavity and thereby form a finish or neck portion for the article being produced. Simultaneously with the application of vacuum to the neck mold cavity, air pressure is applied through the lower end of the blank mold to assist in moving the mass of glass upwardly in the blank mold. Thus, a positive differential pressure is created in the two molds to insure quick and effective movement of the glass. The plunger 97 is now lifted away from the glass and neck mold so that air pressure supplied thru a pipe 131 may be blown into the initial blow opening formed by said plunger to thereby expand the glass to fill both the blank and neck mold cavities and thereby form a complete parison. A valved bleed opening 182 in the lower portion of the blank mold 24 assists materially in proper expansion of the glass in the blank mold.

The parison is now ready for transfer to the finishing mold for final blowing. This is obtained by operation of the rack and pinion mechanism by the cam 38 (Fig. 1) to lower the blank mold and leave the bare parison suspended from the neck mold. At this period, the cams 159 and 173 (Fig. 1) operate to move the finishing mold 150 and bottom plate 160 into cooperative relation with each other and with the neck mold which is now supporting the formed parison. As above stated, the bottom plate moves radially outward a predetermined distance and then swings upwardly so that it becomes axially aligned with the suspended parison and is in position to cooperate with the finishing mold which, by means of the slide block 156, is closed about said bottom plate and suspended parison. The cam 136 (Figs. 5 and 9) is shaped to rock the arm 134 immediately following enclosure of the parison by the finishing mold so that final blowing air may be applied to the parison by way of the flexible pipe 131 and annular chamber 132 in the extension 118 on the air motor cylinder. After the parison has been expanded in the finishing mold, the latter is opened and the cam 173 moves the inner slide block 169 radially inward to thereby tilt the bottom plate and discharge the article into a trough 183 or the like. The coil spring 174 cooperates with the cam in effecting a positive tilting of the bottom plate 160.

When it is desired to change the height or type of molds to produce different kinds of ware, the adjusting screw or screws 145 (Fig. 1) may be rotated to thereby change the elevation of the mechanism carried by the tables 19 and 140. This adjustment relative to the finishing mold table 20 permits substitution of different types of finishing molds which, together with the replacement of the blank mold 24 by another of the desired type, completes the necessary mold changes. Thus, it is apparent that a machine of the type described is quite flexible in that it may be employed in the production of many types of ware, adjustments being obtained with ease.

Modifications may be resorted to within the spirit and scope of the appended claims.

What I claim is:

1. In a glassware forming machine, the combination of a vertically movable blank mold having an open upper charge receiving end, and a unit associated with said mold and including a funnel guide and a neck mold each comprising separable sections movable together to an operative position at said open end of the blank mold, and means whereby separation and consequent inoperative positioning of the sections of either the funnel guide or neck mold operatively positions the other element at said open end of the blank mold.

2. In a glassware forming machine, the combination of a blank mold, a partible two section neck mold adapted to cooperate at times with the upper end of said blank mold, funnel guide sections secured to the neck mold sections, and means to oscillate said neck mold and funnel guide sections about an axis common to both the guide and neck mold to alternately bring the neck mold and funnel guide into cooperative relation to the blank mold.

3. In a glassware forming machine, the combination of a blank mold, a partible two section neck mold adapted to cooperate at times with the upper end of said blank mold, a funnel guide comprising two sections secured to the neck mold sections, means to oscillate said neck mold and funnel guide sections about an axis common to both the guide and neck mold to alternately bring the neck mold and funnel guide into operative relation to the blank mold, an air motor movable into vertical alignment with the blank and neck molds when said blank and neck molds are cooperating with each other, a plunger carried by the motor for projection into the neck and blank mold cavities, and means to operate the motor to cause such projection of the plunger.

4. In a glassware forming machine, the combination of a blank mold, a partible two section neck mold adapted to cooperate at times with the upper end of said blank mold, a funnel guide comprising two sections secured to the neck mold sections, means to oscillate said neck mold and funnel guide sections about an axis common to both the guide and neck mold to alternately bring the neck mold and funnel guide into operative relation to the blank mold, an air motor movable into vertical alignment with the blank and neck molds when said molds are cooperating with each other, a plunger carried by the motor for projection into the neck and blank mold cavities, means to operate the motor to cause such projection of the plunger, and means to apply differential pressure to opposite sides of a mass of glass in the blank mold to move said glass longitudinally in the blank mold to fill the neck mold cavity.

5. In a glassware forming machine, the combination of a partible two section neck mold, a partible two section funnel guide having its sections rigidly fixed respectively to the neck mold sections, a horizontally extending support, arms oscillatively mounting the neck mold and funnel guide sections on said support, and cam and slide mechanism for oscillating said arms about the support at regular intervals to alternately cooperatively position the neck mold and funnel guide sections, said mechanism including adjustable links to control the degree of relative movement of the mold and funnel guide sections.

Signed at Toledo, Ohio, this 15th day of Sept., 1928.

VICTOR E. HOFMANN.